(12) United States Patent
Gonidec

(10) Patent No.: US 8,764,072 B2
(45) Date of Patent: Jul. 1, 2014

(54) LOCKING DEVICE WITH MECHANICAL DETECTION OF CLOSING AND OPENING

(71) Applicant: Aircelle, Gonfreville L'Orcher (FR)

(72) Inventor: Patrick Gonidec, Bretx (FR)

(73) Assignee: Aircelle, Gonfreville L'Orcher (FR)

( * ) Notice: Subject to any disclaimer, the term of this patent is extended or adjusted under 35 U.S.C. 154(b) by 0 days.

(21) Appl. No.: 13/867,904

(22) Filed: Apr. 22, 2013

(65) Prior Publication Data

US 2013/0234447 A1 Sep. 12, 2013

Related U.S. Application Data

(63) Continuation of application No. PCT/FR2011/052180, filed on Sep. 21, 2011.

(30) Foreign Application Priority Data

Oct. 21, 2010 (FR) .................................. 10 58591

(51) Int. Cl.
  *E05C 19/10* (2006.01)
  *E05B 65/12* (2006.01)
  *E05C 19/00* (2006.01)

(52) U.S. Cl.
  CPC ............... *E05B 83/243* (2013.01); *E05B 83/16* (2013.01)
  USPC .............. 292/129; 292/95; 292/106; 292/207

(58) Field of Classification Search
  USPC ........... 292/95, 106, 129, 130, 131, 136, 202, 292/207, 256.69, 341.15, DIG. 49
  See application file for complete search history.

(56) References Cited

U.S. PATENT DOCUMENTS

| | | | | |
|---|---|---|---|---|
| 398,609 A | * | 2/1889 | Hall | 70/113 |
| 682,776 A | * | 9/1901 | Zitzmann | 292/254 |
| 2,272,909 A | * | 2/1942 | Fantl | 40/460 |
| 2,508,090 A | * | 5/1950 | Beems et al. | 292/129 |
| 2,565,669 A | * | 8/1951 | Smith | 116/290 |
| 2,704,218 A | * | 3/1955 | Claud-Mantle | 292/113 |
| 2,904,141 A | * | 9/1959 | Henrichs | 403/321 |
| 3,087,749 A | * | 4/1963 | Capton | 292/99 |
| 3,463,529 A | * | 8/1969 | Lo Rubbio et al. | 292/106 |
| 4,243,255 A | * | 1/1981 | Hornak | 292/113 |
| 4,346,924 A | * | 8/1982 | Herriott | 292/129 |
| 4,490,999 A | * | 1/1985 | Castle et al. | 70/432 |
| 4,828,299 A | | 5/1989 | Poe | 3/31 |
| 4,936,239 A | * | 6/1990 | Awalt, Jr. | 114/199 |
| 4,938,508 A | * | 7/1990 | Thomas | 292/235 |
| 5,002,002 A | * | 3/1991 | Awalt, Jr. | 114/210 |
| 5,152,559 A | * | 10/1992 | Henrichs | 292/113 |

(Continued)

FOREIGN PATENT DOCUMENTS

EP 0431769 6/1991
WO 2009009732 1/2009

*Primary Examiner* — Carlos Lugo
(74) *Attorney, Agent, or Firm* — Brinks Gilson & Lione

(57) ABSTRACT

A locking device includes a bolt capable of engaging with a corresponding hook, the bolt being mounted against a resilient return spring that tends to return the bolt into a spaced apart position. The locking device further includes a detection linkage, which is moveable between a first position and a second position. In the first position, the linkage enables unlocking of the bolt and the hook. In the second position, the linkage engages with a portion of the locking pair so as to block the unlocking.

9 Claims, 2 Drawing Sheets

(56) References Cited

U.S. PATENT DOCUMENTS

Figure 1:
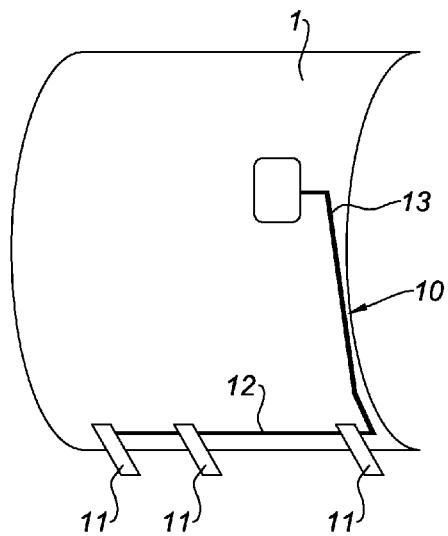

| | | | |
|---|---|---|---|
| 5,984,382 A | 11/1999 | Bourne et al. | 3/13 |
| 6,622,964 B2* | 9/2003 | Rouyer et al. | 244/110 B |
| 7,204,458 B2* | 4/2007 | Porte et al. | 244/129.4 |
| 7,416,228 B2* | 8/2008 | Pfitzinger et al. | 292/216 |
| 7,552,954 B2* | 6/2009 | Rozo et al. | 292/336.3 |
| 7,780,208 B2* | 8/2010 | Koppenhoehl et al. | 292/340 |
| 8,186,728 B2* | 5/2012 | Kopylov | 292/113 |
| 2006/0076785 A1* | 4/2006 | Eriksson | 292/247 |

\* cited by examiner

LOCKING DEVICE WITH MECHANICAL DETECTION OF CLOSING AND OPENING

CROSS-REFERENCE TO RELATED APPLICATIONS

This application is a continuation of International Application No. PCT/FR2011/052180 filed on Sep. 21, 2011, which claims the benefit of FR 10/58591, filed on Oct. 21, 2010. The disclosures of the above applications are incorporated herein by reference.

FIELD

The present disclosure relates to a locking system and related mechanical system for detecting the closing or opening of the locking system, and in particular for application in a nacelle cowl or hatch of a turbine engine.

BACKGROUND

The statements in this section merely provide background information related to the present disclosure and may not constitute prior art.

An aircraft nacelle is intended to surround a turbine engine and to produce the thrust of the turbine engine by channeling the flows generated by the engine. It should also be able to be opened in order to access the engine and its equipment.

Most turbine engine nacelles comprise a fan cowl surrounding the fan case of the engine and a rear body (often a thrust inverter) surrounding the central portion of the engine.

In order to ensure access to the engine and to its equipment, both of these nacelle components generally open in two half portions.

The opening of these cowls or hatches is allowed by means of the presence of hinges, generally mounted on the upper portion of the nacelle, in a so-called 12 o'clock position, along a pylon line, and are maintained closed by a plurality of locks generally mounted along a locking line in a lower, so-called 6 o'clock portion.

It is desirable that after a maintenance operation, the whole of the locks is closed.

For this purpose, it should be possible to ensure in an efficient, safe and rapid way, proper locking of all the cowls which may be opened, of a nacelle prior to any use of the nacelle. Today, in most cases, this check quasi entirely relies on the attention of the mechanic who carries out the locking operation. Consequently, certain maintenance errors have caused a significant number of bad closures of fan cowls, sometimes inducing major events during flights (opening and loss of a fan cowl). A clear indicator of the locking of the nacelle cowls is therefore a significant source for improving safety of flights.

One of the most frequent causes of opening during flight is the partial closing or opening of the cowl locks. In this scenario, it is often difficult during a routine check to notice that one or several locks are badly closed, since the locking of a single lock <<puts into place>> the cowl which from a distance then seems to be properly closed.

Thus, in order to provide an efficient detection system, it should be possible to initiate unlocking or to be able to partly unlock the cowl without the corresponding status indicator displaying an unlocked status.

Of course, such considerations also apply to nacelles not equipped with thrust inverters, so-called smooth nacelles, and comprising cowls which may be opened allowing access to the inside of the nacelle in the same way, as well as to other maintenance cowls fitting out the nacelle.

Such electric systems for detecting locking are known which give the possibility of ensuring a visual inspection of the situation. Such a system however requires an electric power supply source and is subject to possible electrical failures.

One of the difficulties of a mechanical system is however to ensure that the unlocking indicator actually displays an unlocking status as soon as the first lock is open, and conversely that this indicator can only switch to a locking status when strictly all the locks are locked.

Moreover, the existing mechanical systems are limited to checking the position of the handle of the lock, while the sought mechanical function is putting the locks under stress.

SUMMARY

The present disclosure is directed to a locking device between first structure and a second structure, comprising at least one locking pair including at least one bolt attached to the first structure and capable of engaging with at least one corresponding retaining means, attached to second structure, and the bolt moreover being moveably mounted against at least one resilient return means which tends to return the bolt into a spaced-apart position of the retaining means.

The locking device is characterized in that it comprises at least one detection linkage, moveably mounted between a first position in which it allows unlocking of the bolt and of the retaining means, at least one portion of the bolt then being engaged with the linkage, so as to block a possible return of the latter towards a second position, and said second position in which the linkage engages with at least one portion of the locking pair so as to block the unlocking thereof.

Thus, by providing a linkage blocked in position by the bolt when the locking pair is unlocked, the linkage cannot return to its second position, indicating locking of the device when the locking pair is actually locked again. In the case of a set of locking pairs for which the linkages are connected together, the latter will therefore be able to return to their second position indicating re-locking of the associated locking pair only when all the locking pairs will have been actually relocked.

Conversely, for unlocking, by providing a linkage element engaging with a portion of the locking pair in order to block the unlocking thereof, it is desired to swing the linkage into its first position, therefore indicating unlocking, in order to actually proceed with the unlocking of the locking pair.

Thus, by means of such a device, a situation indicator bound to the linkage will properly indicate the status of the locking pairs and will prevent any change of status which would be passed on to said situation indicator.

Advantageously, the bolt appears as a U-bolt in one form of the present disclosure.

In another form, the retaining means appears as a hook.

In still another form, the linkage will engage with the retaining means so as to prevent its opening.

Advantageously, the linkage portion which will prevent the unlocking of the unlocking pair, appears as a blocking finger.

According to a another form, the portion of the linkage capable of engaging with the bolt so as to block the return of the linkage into its second position, is a rod mounted so as to be translationally moveable.

Advantageously, the rod has a longitudinal lumen capable of engaging with a rod borne by the bolt and being used as an abutment for the linkage rod.

In one form, the linkage is bound to a means for indicating an unlockable or locked condition of the locking pair.

Advantageously, the bolt is associated with at least one means for adjusting its tension at the end of travel, notably made as a stretching screw end.

According to one aspect of the present disclosure, the device comprises several locking pairs, notably positioned along a locking line, the associated linkages being connected together through at least one mechanical transmission means.

The present disclosure also relates to a turbine engine nacelle comprising at least one moveable cowl, characterized in that it comprises at least one associated locking device according to any of the claims. More particularly, this may be a moveable cowl of a middle section surrounding a fan of the turbine engine.

Further areas of applicability will become apparent from the description provided herein. It should be understood that the description and specific examples are intended for purposes of illustration only and are not intended to limit the scope of the present disclosure.

DRAWINGS

Figure 2:
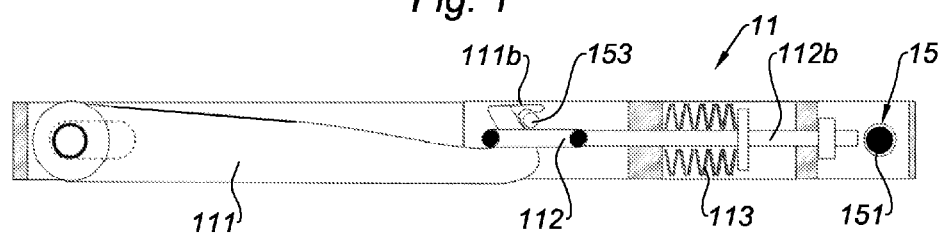
Figure 3:
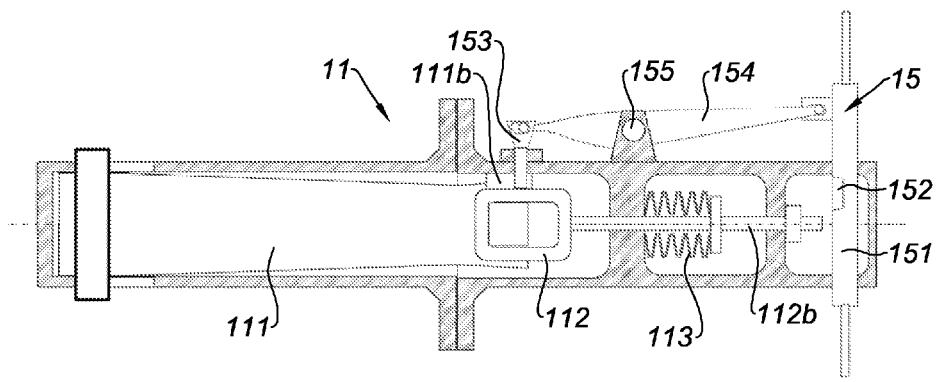
Figure 4:
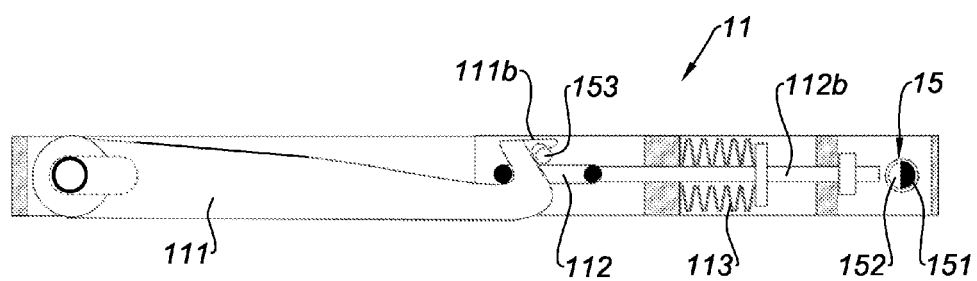
Figure 5:
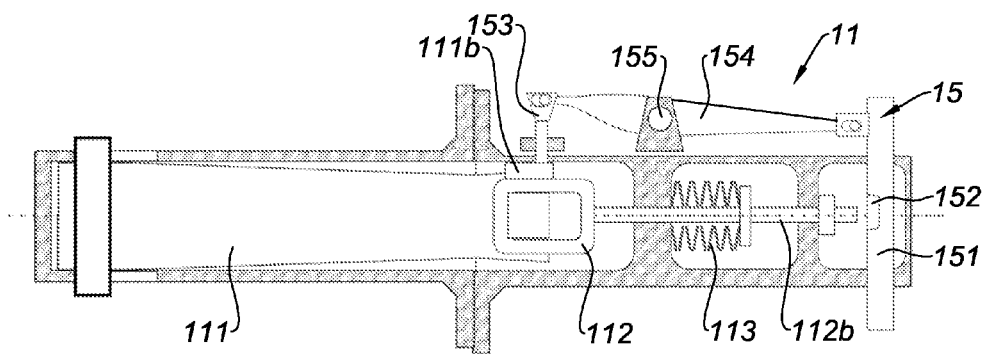
Figure 6:
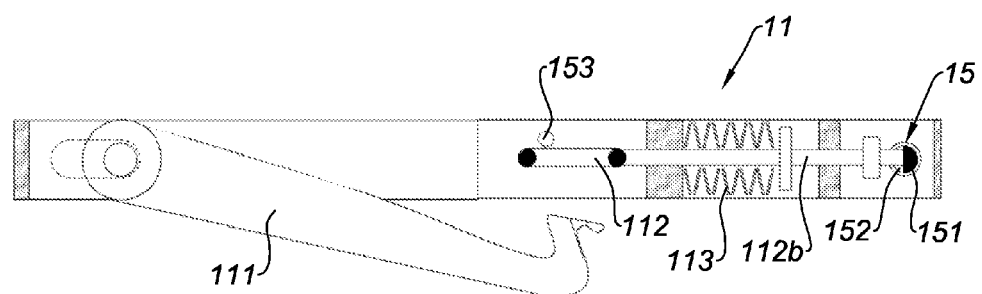

In order that the present disclosure may be well understood, there will now be described various forms thereof, given by way of example, reference being made to the accompanying drawings, in which:

FIG. 1 is a schematic illustration of an opening nacelle cowl equipped with a locking device according to the present disclosure, FIG. 2 is a schematic illustration in a longitudinal sectional view as seen from the side, of a locking pair of the device of FIG. 1, said locking pair being locked, FIG. 3 is a schematic illustration in a longitudinal sectional view as seen from the top, of the locking pair of FIG. 2, FIG. 4 is a schematic illustration in a longitudinal sectional view as seen from the side, of the unlocking pair of FIG. 1, said locking pair being unlocked, FIG. 5 is a schematic illustration in a longitudinal sectional view as seen from the top, of the locking pair of FIG. 4, and FIG. 6 is a schematic illustration in a longitudinal sectional view as seen from the side, of the unlocking pair of FIG. 2, said locking pair being unlocked.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows an opening cowl 1 of a turbine engine nacelle (not shown). More particularly, this may be a fan cowl.

The cowl 1 is pivotally mounted around an upper hinge line (not shown) and is capable of being locked in the lower portion at a locking line along which a locking device 10 according to the present disclosure is installed.

This locking device 10 comprises a plurality of locking pairs 11 having, according to the present disclosure a linkage 12 bound to a (lock/unlock) status indicator 13.

A locking pair 11 and its operation according to the present disclosure are illustrated in detail in FIGS. 2 to 6.

A locking pair 11 conventionally comprises a bolt appearing as a new bolt 112 and capable of cooperating with a corresponding hook 111 forming a retaining means for the bolt.

In the forms according to the state of the art, this U-bolt is generally fixed with respect to the structure of the lock onto which it is screwed.

In the present disclosure, the U-bolt 112 has a rod 112b by means of which it is mounted so as to be translationally moveable between a locking position in which it may be engaged with the hook 111 and an unlocking position in which it is moved apart from the hook 111.

Further, the U-bolt 112 is mounted against a resilient return means appearing as a spring 113 tending to sending it back into the unlocked position.

According to the present disclosure, the locking pair 11 is associated with a detection linkage 15.

This linkage 15 is moveable between a first position in which it allows unlocking of the U-bolt 112 and of the hook 111 and a second position in which the linkage will engage with at least one portion of the locking pair, so as to block the unlocking thereof.

To do this, the linkage 15 comprises a first translationally moveable element along a direction substantially transverse to the locking pair and appearing as a rod 151 having a transverse lumen 152. The rod 151 and the lumen 152 are positioned so that, on the one hand, when the linkage 15 is in its first position allowing unlocking, the rod 112b of the U bolt 112 penetrates the lumen 152 of the rod 151 which is then used as an abutment for the latter, and on the other hand, when the linkage 15 is in its second position corresponding to the locking of the locking pair 11, the rod 151 is used as an abutment for the rod 112 of the U bolt 112, preventing possible backward movement of the latter.

The linkage 15 also comprises a second moveable element appearing as a locking finger 153 moveably mounted along a direction substantially transverse to the locking pair 11 capable of cooperating with the hook 111, notably via a small end hook 111b, so as to prevent unlocking of said hook 11. It should be specified that this locking finger is not designed to form a secured locking means during flight, and thus replacing other defense lines for preventing the opening of the hook, but designed to retain said hook 11 against an unintended opening by an operator, according to the present disclosure.

Alternatively, it is notably possible to provide instead of a locking finger 153, a concealing plate capable of pivoting so as to conceal or clear the access to the lock handle.

The locking finger 153 is connected to the rod 151 through a swing 154 with a pivot 155 ensuring that the locking finger 153 is retracted when the rod 151 is in the position allowing unlocking, and conversely that the locking finger 153 is engaged when the rod 151 blocks the withdrawal of the U-bolt 112. This device therefore prevents the operator from unlocking the lock, when the locking indicator is not disabled by the operator.

The operation of the device is detailed in FIGS. 2 to 6.

FIGS. 2 and 3 show a locking pair 11 in the locked position.

The U-bolt 122 is therefore engaged with the hook 111 which retains it against the spring 113.

The linkage 15 is in its second position and the locking finger 153 locks the opening of the hook 111.

The unlocking of the locking pair 11 is therefore possible only if the linkage 15 is swung into its first position, as illustrated in FIGS. 4 and 5.

Swung into this position, the rod 151 is displaced in its first position, such that the lumen 152 is located facing the rod 112b of the U-bolt 112 and allows its moving apart.

By doing this, the swing 154, jointed on its pivot 155, causes retraction of the locking finger 153 which releases the hook 111.

The unlocking of the locking pair 11 is now allowed. This step is illustrated in FIG. 6. The U-bolt 112 is then released and forced to withdraw by its spring 113. This causes the backward movement of the rod 112b of the U-bolt which penetrates into the lumen 152 and will block any translational movement of the rod as in 151.

Thus, in the case of a plurality of locking pairs 11 as visible in FIG. 1, each linkage 15 of each pair is connected to the next linkage, so as to form a unique mechanical chain forming the linkage 12 at a scale of the whole of the locking device 10 which transmits the unlocking or locking state of the device to the associated indicator 13.

Thus, as the linkage 15 is subject to the unlocking indicator, an operator can only unlock the cowl 1 after having positioned the indicator 13 in the unlocked position and therefore if the indicator 13 of the unlocking system 10 actually indicates a possible unlocking status.

Conversely, the indicator 13 can only switch back to the locking position, i.e. by showing that the locking is secured, only if all the unlocking pairs 11 have been re-locked. Indeed, taking the linkage system 12, 15, into account, a single non-locked locking pair 11 locks the linkage 15 and therefore prevents the linkage 12 from swinging the indicator 13 towards the position indicating relocking.

Moreover, the device of the present disclosure is mechanical and is therefore reliable and not subject to electrical failures.

Although the present disclosure has been described with a particular exemplary form, it is quite obvious that it is by no means limited thereto and that it comprises all the technical equivalents of the described means, as well as their combinations if the latter enter the scope of the present disclosure.

Notably, the bolt 112 may be adjustable in tension, notably by means a stretching screw rod 112b.

What is claimed is:

1. A locking device between a first structure and a second structure, the locking device comprising:
    at least one locking pair including at least one bolt attached to the first structure and capable of engaging with at least one corresponding retaining means attached to the second structure, the bolt being moveably mounted against at least one resilient return means tending to return it into a moved-apart position of the retaining means, said retaining means being manually operated,
    wherein said locking device further comprises at least one manually operated detection linkage, moveably mounted between a first position in which it allows unlocking of the bolt and of the retaining means, at least one portion of the bolt then being engaged with the linkage, so as to block a possible return of the latter towards a second position, and said second position in which the linkage engages with at least one portion of the locking pair so as to block the unlocking thereof,
    wherein a portion of the linkage capable of engaging with the bolt so as to block the return of the linkage into its second position is a rod mounted so as to be translationally moveable,
    wherein the rod has a longitudinal lumen capable of engaging with a rod borne by the bolt and used as an abutment for the linkage rod.

2. The device according to claim 1, wherein the bolt appears as a U-bolt.

3. The device according to claim 1, wherein the retaining means appears as a hook.

4. The device according to claim 1, wherein the linkage will engage with the retaining means, so as to prevent the opening thereof.

5. The device according to claim 1, wherein a linkage portion which will limit the unlocking of the unlocking pair, appears as a blocking finger.

6. The device according to claim 1, wherein the linkage is bound to a means for indicating an unlockable or locked state of the locking pair.

7. The device according to claim 1, wherein the bolt is associated with at least one means for adjusting its tension at the end of travel, notably made in the form of a stretching screw end.

8. The device according to claim 1, wherein the device further comprises several locking pairs, notably positioned along a locking line, the associated linkages being connected together through at least one mechanical transmission means.

9. A turbine engine nacelle comprising at least one moveable cowl comprising at least one locking device between a first structure and a second structure, the locking device comprising:
    at least one locking pair including at least one bolt attached to the first structure and capable of engaging with at least one corresponding retaining means attached to the second structure, the bolt being moveably mounted against at least one resilient return means tending to return it into a moved-apart position of the retaining means, said retaining means being manually operated,
    wherein said locking device further comprises at least one manually operated detection linkage, moveably mounted between a first position in which it allows unlocking of the bolt and of the retaining means, at least one portion of the bolt then being engaged with the linkage, so as to block a possible return of the latter towards a second position, and said second position in which the linkage engages with at least one portion of the locking pair so as to block the unlocking thereof,
    wherein the device further comprises several locking pairs, notably positioned along a locking line, the associated linkages being connected together through at least one mechanical transmission means.

* * * * *